United States Patent
Miyazaki et al.

[11] Patent Number: 6,151,228
[45] Date of Patent: Nov. 21, 2000

[54] FILTER APPARATUS FOR USE IN AN INVERTER APPARATUS

[75] Inventors: Hiroshi Miyazaki; Junichi Takuma; Hidetoshi Kanazawa; Eiji Sato, all of Fuji; Toshiyuki Kamimura, Yokohama, all of Japan

[73] Assignee: Kabushiki Kaisha Toshiba, Kawasaki, Japan

[21] Appl. No.: 09/173,558

[22] Filed: Oct. 16, 1998

[30] Foreign Application Priority Data

Oct. 16, 1997 [JP] Japan .................................. 9-283670
Dec. 24, 1997 [JP] Japan .................................. 9-355433

[51] Int. Cl.$^7$ .................................................. H02M 1/14
[52] U.S. Cl. ............................................. 363/48; 363/37
[58] Field of Search ................................. 363/34, 36, 37, 363/39, 40, 44, 47, 48

[56] References Cited

U.S. PATENT DOCUMENTS

| | | | |
|---|---|---|---|
| 4,833,377 | 5/1989 | Volk et al. ............................. | 318/747 |
| 4,849,950 | 7/1989 | Sugiura et al. ........................ | 363/48 |
| 4,888,675 | 12/1989 | Kumar et al. .......................... | 363/47 |
| 5,905,642 | 5/1999 | Hammond .............................. | 363/37 |
| 5,936,856 | 8/1999 | Xiang ................................... | 363/39 |

FOREIGN PATENT DOCUMENTS

| | | | |
|---|---|---|---|
| 0780960 | 6/1997 | European Pat. Off. ......... | H02M 7/00 |
| 0809346 | 11/1997 | European Pat. Off. ......... | H02M 1/12 |
| 809346A1 | 11/1997 | European Pat. Off. ......... | H02M 1/12 |
| 9-266677 | 10/1997 | Japan .............................. | H02M 7/48 |

*Primary Examiner*—Jeffrey Sterrett
*Attorney, Agent, or Firm*—Pillsbury Madison & Sutro Intellectual Property

[57] ABSTRACT

A filter apparatus has a current-detecting coil. The coil detects a high-frequency leak current flowing from the phase-windings of a motor to the earth terminal through the closed case of a compressor. A current-canceling circuit generates a current similar in waveform to the high-frequency leak current detected by the coil. The current thus generated cancels out the high-frequency leak current.

10 Claims, 10 Drawing Sheets

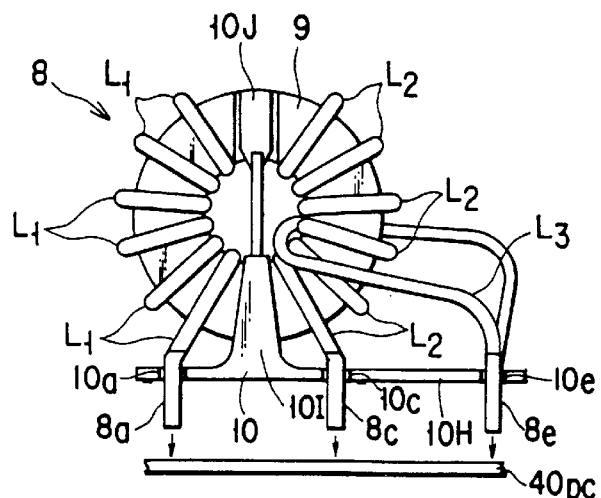
FIG. 13
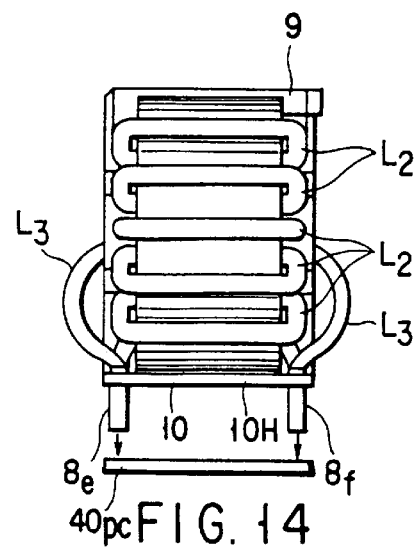
FIG. 14
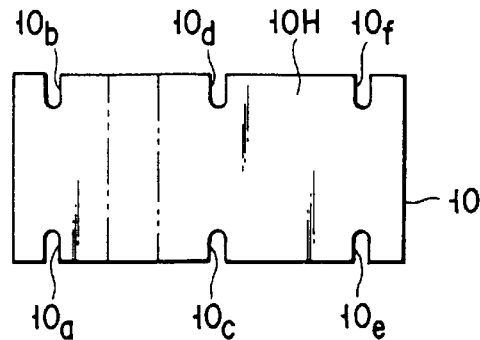
FIG. 15
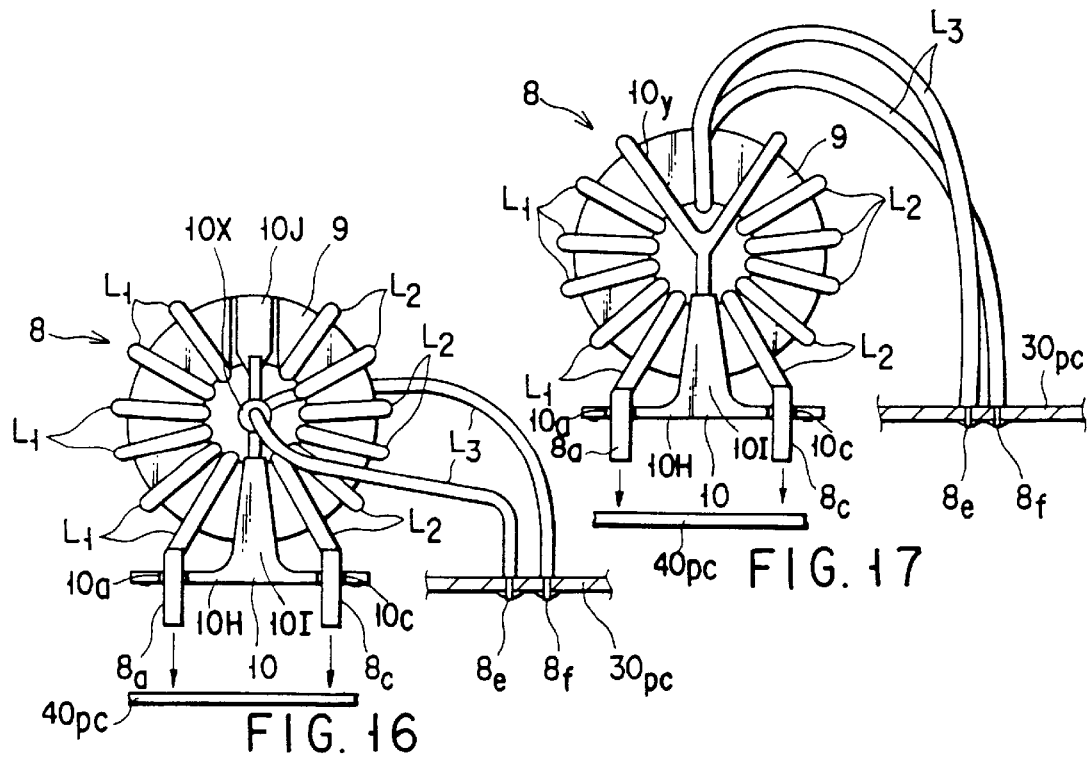
FIG. 16
FIG. 17

FILTER APPARATUS FOR USE IN AN INVERTER APPARATUS

BACKGROUND OF THE INVENTION

The present invention relates to an inverter apparatus for use in a refrigerating apparatus having a compressor, and also to a filter apparatus for use in the inverter apparatus.

A refrigerating apparatus such as an air conditioner or a refrigerator comprises a compressor and an inverter apparatus for driving the electric motor incorporated in the compressor.

The inverter apparatus has a DC circuit and a switching circuit. The DC circuit converts the voltage of a commercially available AC power supply to a DC voltage. The switching circuit performs switching on the DC voltage, converting the DC voltage to a high-frequency voltage. The high-frequency voltage is supplied, as drive power, to the electric motor incorporated in the compressor.

The compressor comprises a closed case, in which the electric motor is provided. The closed case is made of metal (e.g., iron). The case is connected to the earth terminal for the sake of safety.

The electric motor is a brush-less DC motor having three phase-windings. Electrostatic capacitance (generally known as "stray capacitance") exists between the closed case (i.e., the earth terminal) and the phase-windings. As the switching circuit operates, switching the DC voltage output from the DC circuit, a leakage current having a frequency of several megahertz (MHz) flows from the phase-windings to the earth terminal.

The high-frequency leakage current dielectrically flows toward the commercially available power supply. The leakage current may adversely influence the control of the inverter apparatus and may cause errors in other electrical appliances, the breaker and the like.

To reduce the high-frequency leakage current, choke coils may be provided on the conduction lines that connect the output of the inverter apparatus to the electric motor. Alternatively, the switching frequency of the inverter apparatus may be lowered for the same purpose. If choke coils are so provided, however, it may still by difficult to reduce the high-frequency leakage current sufficiently when the switching frequency of the inverter apparatus increases. If the switching frequency of the inverter apparatus, it will be impossible to enhance the performance of the compressor increases, resulting in an inadequate refrigerating efficiency.

BRIEF SUMMARY OF THE INVENTION

The object of the invention is to provide an inverter apparatus for use in a refrigerating apparatus having a compressor, which has a switching circuit, which can be manufactured at low cost and which can yet reliably reduce the leakage current from the compressor even if the switching frequency of the switching circuit is high.

According to the invention there is provided an inverter apparatus for supplying drive power to a motor that has a plurality of phase-windings and which is contained in a closed metal case of a compressor, which is connected to the ground. The inverter apparatus comprises: a DC circuit for converting a voltage of an AC power supply to a DC voltage; a switching circuit for switching an output voltage of the DC circuit, thereby converting the same to a high-frequency voltage, and for applying the high-frequency voltage as the drive power for the motor; a noise-removing filter provided on lines that connect the DC circuit and the switching circuit; a current-detecting coil provided in the filter for detecting a leakage current flowing from the phase-windings of the motor to ground through the closed case, the characterization of the current detecting coil being at least made of a wire thinner than the wires forming the coils of the filter apparatus or the coil has less turns than each of the coils of the filter; and a current-canceling circuit for generating a current similar in waveform to the leakage current detected by the current-detecting coil, and for canceling out the leakage current. The current-canceling circuit has an output terminal that is connected to ground.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 13 is a front view of the filter apparatus incorporated in a fourth embodiment of the present invention;

FIG. 14 is a side view of the filter apparatus illustrated in FIG. 13;

FIG. 15 is a plan view of the base of the core stand provided in the filter apparatus shown in FIG. 13;

FIG. 16 is a front view of the filter apparatus incorporated in a fifth embodiment of the invention;

FIG. 17 is a front view of the filter apparatus incorporated in a sixth embodiment of the present invention;

DETAILED DESCRIPTION OF THE INVENTION

The first embodiment of the invention will be described.

Figure 1:
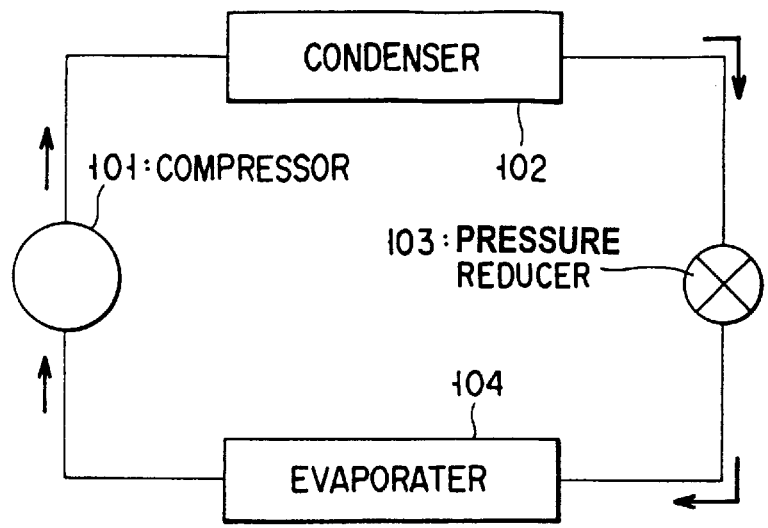
FIG. 1 is a diagram showing a refrigeration cycle relating to the present invention.

FIG. 1 shows the refrigeration cycle relating to the first embodiment. The refrigeration cycle comprises a compressor 101, a condenser 102, a pressure reducer 103, and an evaporator 104. The pressure reducer 103 is, for example, an expansion value or a capillary tube. The compressor 101, condenser 102, pressure reducer 103 and evaporator 104 are connected by pipes, constituting a loop. The refrigeration cycle thus formed is filled with refrigerant.

Figure 2:
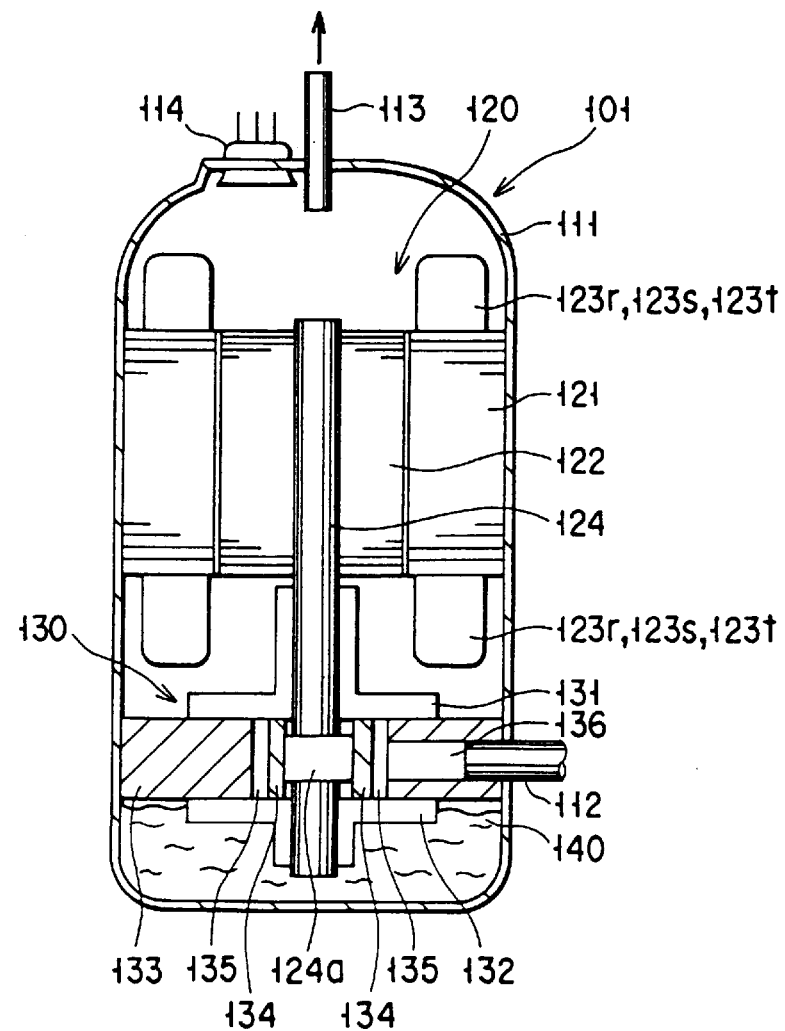
FIG. 2 is a sectional view of a compressor relating to the invention.

As shown in FIG. 2, the compressor 101 comprises a closed case 111 made of metal. A suction pipe 112 is connected to the lower end part of the case 111. A discharge pipe 113 and a terminal 114 are connected to the top of the case 111. The compressor 101 further comprises a motor 120 and a compressing section 130, which are contained in the closed case 111. The motor 120 is provided to drive the compressing section 130.

The motor 120 is a brush-less DC motor comprising a stator 121 and a rotor 122. Three phase-windings 123r, 123s and 123t are wound around the stator 121. The rotor 122 comprises a number of steel discs. and permanent magnets (for example, four magnets). The steel discs are piled one upon another, to form a cylinder which has an axial hole. A shaft 124 extends through the axial hole of the cylinder composed of the steel discs. The permanent magnets are embedded in the cylinder, surrounding the shaft 124.

An electric current is supplied to the phase-windings 123r, 123s and 123t sequentially and repeatedly, thus accomplishing commutation. As a result, the windings 123r, 123s and 123t generate magnetic fields, one after another. The magnetic fields interact with the magnetic fields of the permanent magnets in the rotor 122, generating a torque in the rotor 122.

The compressing section 130 has a main bearing 131, a sub-bearing 132, and a cylinder 133. The main bearing 131 and the sub-bearing 132 support the shaft 124. The cylinder 133 is clamped between the bearings 131 and 132 and loosely mounted on the shaft 124. The shaft 124 has an eccentric part 124a, which is contained in the cylinder 133. A roller 134 is mounted on the eccentric part 124a. A compression chamber 135 is defined between the outer circumferential surface of the roller 134 and the inner circumferential surface of the cylinder 133. The compression chamber 135 communicates with an inlet port 136, which in turn communicates with the inlet pipe 112. The cylinder 133 has a discharge port (not shown), which connects the compression chamber 135 to the upper part of the closed case 111.

When the rotor 122 of the motor 120 rotates, the shaft 124 rotates. The roller 134 provided in the compression section 130, which is mounted on the eccentric part 124a of the shaft 124, is rotated, generating a negative pressure. Refrigerant is thereby drawn into the compression chamber 135 through the suction pipe 112 and compressed in the chamber 135. The refrigerant compressed is supplied through the discharge port (not shown) into the upper part of the closed case 111. The refrigerant is further supplied to the condenser 102, first through the discharge pipe 113 and then through the pipe connecting the compressor 101 and the condenser 102.

Lubricant oil 140 is contained in the bottom of the closed case 111. The oil 140 performs two functions. First, it lubricates the mechanical components of the compression section 130. Second, it cools the compression section 130.

Figure 3:
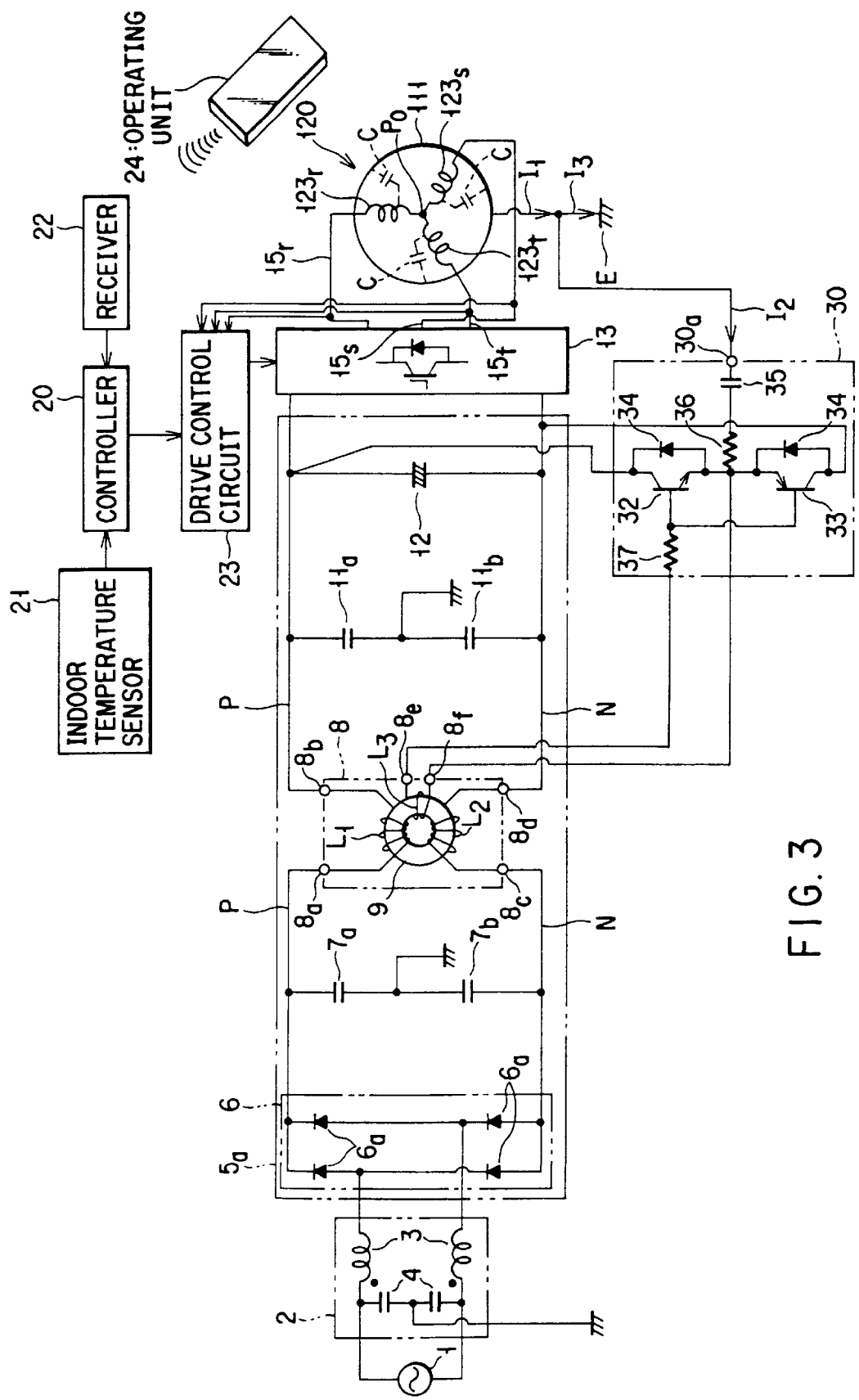
FIG. 3 is a block diagram showing the control circuit incorporating an inverter apparatus according to a first embodiment of the present invention.

An inverter apparatus shown in FIG. 3 is provided to supply drive power to the motor 120. As shown in FIG. 3, the inverter apparatus comprises a first filter apparatus (low-pass filter, or generally known as "line filter") 2, a DC circuit 5a, a switching circuit 13, a current-canceling circuit 30, and a current-detecting coil $L_3$. The first filter apparatus 2 is connected to a commercially available power supply 1. The DC circuit 5a is connected to the output of the first filter apparatus 2.

The first filter apparatus 2 comprises two choke coils 3 and two capacitors 4. The first filter apparatus 2 prevents a high-frequency noise from propagating from the DC circuit 5a to the power supply 1.

The DC circuit 5a comprises a rectifier circuit 6, a second filter apparatus (low-pass filter) 8, and a smoothing capacitor 12. The rectifier circuit 6 has four diodes 6a connected, forming a bridge. The second filter apparatus 8 is connected to the output of the rectifier circuit 6, for removing noise. The smoothing capacitor 12 is connected to the output of the second filter apparatus 8. Thus structured, the DC circuit 5a converts the AC voltage applied from the power supply 1 to a DC voltage. The output of the DC circuit 5a is connected to the switching circuit 13, which will be described later.

The second filter apparatus 8 comprises a ferrite core 9 and a pair of coils $L_1$ and $L_2$. The coils $L_1$ and $L_2$ are copper synchronous windings, both wound around the ferrite core 9. The coils $L_1$ and $L_2$ are provided on DC lines P and N, respectively. The lines P and N connect the rectifier circuit 6 to the switching circuit 13. Assume that a noise is generated at a position closer to the load than to the filter apparatus 8. Then, a noise current flows from the noise source through the coil $L_1$, which generates a magnetic field. The noise current flows back through the coil $L_2$, which generates a magnetic field. These magnetic fields cancel each other. Thus, high-frequency noise components are canceled.

The switching circuit 13 has a plurality of switching elements such as power transistors. The power transistors perform switching on the DC voltage applied from the DC circuit 5a, thereby converting the DC voltage to a three-phase high-frequency voltage. The three-phase high-frequency voltage is output from the switching circuit 13.

The output voltage of the switching circuit 13 is applied to the phase-windings 123r, 123s and 123t of the motor 120 through conduction lines 15r, 15s and 15t, respectively. The closed case 111, which contains the motor 120, is connected to an earth terminal E for the sake of safety. The phase-windings 123r, 123s and 123t are connected to a common point Po for star connection.

An electrostatic capacitance C (also known as "stray capacitance") exists between the closed case (i.e., the earth terminal E) and each of the phase-windings 123r, 123s and 123t. When the motor 120 is driven, a common mode voltage is generated between the earth terminal E and the common point Po of the phase-windings 123r, 123s and 123t, through the electrostatic capacitances C. A common mode current is generated from the common mode voltage and flows from the phase-windings 123r, 123s and 123t to the earth terminal E through the capacitances C. The common mode current is equivalent to a high-frequency leakage current $I_1$.

The current-detecting coil $L_3$ is designed to detect the common mode current (i.e., the high-frequency leakage current $I_1$). The coil $L_3$ is characterized in at least one of the following respects. First, it is made of wire thinner than the wires forming the coils $L_1$ and coil $L_2$ of the second filter apparatus 8. Second, it has less turns than the coils $L_1$ and coil $L_2$ of the second filter apparatus 8. The current-detecting coil $L_3$ has a predetermined inductance of, for example, 100 $\mu$H or more.

The current-canceling circuit 30 comprises an amplifier circuit, two diodes 34, a capacitor 35, and two resistors 36 and 37. The amplifier circuit has an NPN transistor 32 and a PNP transistor 33 and is designed to amplify the output voltage of the current-detecting coil $L_3$. The amplifier circuit is driven to operate by the output voltage of the DC circuit 5a. The diodes 34 are provided for preventing a reverse electromotive force. The first diode 34 is connected between the collector and emitter of the transistor 32. The second diode 34 is connected between the collector and emitter of the transistor 33. The capacitor 35 is provided for removing a DC component and has a capacitance equal to the electrostatic capacitances C that exists between the closed case 111 and each of the phase-windings 123r, 123s and 123t. The resistors 36 and 37 are used to remove noises.

The amplifier circuit generates a current $I_2$ having a waveform similar to that of the high-frequency leak current $I_1$. The current $I_2$ is output through the capacitor 35 and the resistor 36, thereby to cancel out the high-frequency leakage current $I_1$. The current-canceling circuit 30 has an output terminal 30a, which is connected to the earth terminal E.

The DC circuit 5a has grounding capacitors 7a and 7b for removing noises. The capacitors 7a and 7b are connected in series between DC lines P and N which connect the rectifier circuit 6 and the second filter apparatus 8.

The DC circuit 5a further has grounding capacitors 11a and 11b for removing noises. These capacitors 11a and 11b are connected in series between DC lines P and N which connect the second filter apparatus 8 and the switching circuit 13.

The controller 20 is provided for controlling the air conditioner. An indoor temperature sensor 21, a receiver 22 and a drive control circuit 23 are connected to the controller 20.

The indoor temperature sensor 21 detects the temperature Ta in the room which is to be air-conditioned by the air conditioner. The receiver 22 receives the infrared rays emitted from an operating unit 24 of remote-control type. The operating unit transmits data for setting operating conditions into the air conditioner, in the form of infrared rays.

The drive control circuit 23 turns on and off the power transistors of the switching circuit 13. The circuit 23 controls the on-drive cycle and off-drive cycle of the power transistors, i.e., the circuit 23 controls the switching frequency of each power transistor. The circuit 23 also performs control (PWM control) on the on-period (on-off duty) of each power transistor.

The operation of the system described above will be described.

The operating unit 24 operates to set a desired indoor temperature Ts. The unit 24 further operates to start the air conditioner. The switching circuit 13 is driven by drive control 23. The output of the switching circuit 13 drives the motor 120. The difference ΔT between the indoor temperature Ta detected by the indoor temperature sensor 21 and the desired temperature Ts set by the operating unit 24 is obtained. The switching frequency of the switching circuit 13 is controlled in accordance with the difference ΔT.

When the switching frequency of the circuit 13 is changed, the rotational sped of the motor 120 changes. The change in the rotational speed of the motor 120 results in a change in the performance of the compressor 101. When the difference reduces to nil, the switching circuit 13 stops operating, and the motor 120 stops, thus interrupting the operation of the compressor 101.

Figure 4:
FIG. 4 shows the waveform of the high-frequency leakage current $I_1$ generated in each embodiment of the invention.

As the switching circuit 13 operates, a common mode voltage is generated between the earth terminal E and the common point Po of the phase-windings 123r, 123s and 123t, through the electrostatic capacitances C. Due to the common mode voltage, a high-frequency leakage current $I_1$ of several megahertz flows from the phase-windings 123r, 123s and 123t to the earth terminal E through the electrostatic capacitances C. The common mode current $I_1$ has such a waveform as is shown in FIG. 4.

Figure 5:
FIG. 5 shows the waveform of the canceling current $I_2$ generated in each embodiment of the invention.

The high-frequency leakage current $I_1$ dielectrically flows toward the commercially available power supply 1. The leakage current may adversely influence the control of the inverter apparatus and may cause errors in other electrical appliances, the breaker and the like. The leakage current is made to flow into the DC circuit 5a. The current-detecting coil $L_3$ detects a current which is proportional to the high-frequency leakage current $I_1$. The output voltage of the current-detecting coil $L_3$ is amplified the transistors 32 and 33, providing a canceling current $I_2$ having a waveform similar to that of the high-frequency leakage current $I_1$, as is illustrated in FIG. 5.

Figure 6:
FIG. 6 shows the waveform of the current $I_3$ flowing to the earth terminal E when the current $I_2$ cancels the high-frequency leakage current $I_1$ in each embodiment of the invention.

The canceling current $I_2$ has such polarity that it tends to flow from the earth terminal E toward the current-canceling circuit 30. Due to the specific polarity and waveform of the canceling current $I_2$, the high-frequency leakage current $I_1$ is canceled as if absorbed into the current-canceling circuit 30. Hence, the current $I_3$ flowing to the earth terminal E comes to have such a low-level waveform as is shown in FIG. 6.

As mentioned above, the high-frequency leakage current $I_1$ is detected, the canceling current $I_2$, is generated whose waveform is similar to that of the leakage current $I_1$, and the leakage current $I_1$ is forcibly canceled with the canceling current $I_2$. Thus, the high-frequency leakage current $I_1$ can be reduced reliably even if the switching frequency of the switching circuit 13 is high. It follows that the switching frequency of the circuit 13 can be increased as much as desired, without adversely influencing the control of the inverter apparatus and without causing errors in other electrical appliances, the breaker and the like. Furthermore, the performance of the compressor 101 can be enhanced sufficiently, enabling the air conditioner to acquire high operating efficiency.

The refrigerant filled in the refrigeration cycle may be HFC refrigerant which has a small electrically insulating property and the lubricating oil used in the compressor 101 may be ester oil (or ether oil) which has a large dielectric constant. If so, the high-frequency leakage current $I_1$ is likely to increase. Nevertheless, the inverter apparatus can reliably reduce the leakage current $I_1$ which has increased due to the use of HFC refrigerant and ester oil (or ether oil).

Once the high-frequency leakage current $I_1$ is thus reduced, it will be possible to inhibit electromagnetic interference such as the voltage appearing on the motor-shaft and on the noise terminal.

Since the current-detecting coil $L_3$ is made of wire thinner than the wires forming the coils $L_1$ and coil $L_2$ of the second filter apparatus 8, its use scarcely increases the manufacturing cost of the inverter apparatus. In addition, the coil $L_3$ has less turns than the coils $L_1$ and coil $L_2$. This also serves to minimize the manufacturing cost of the inverter apparatus.

If the current-detecting coil $L_3$ has an inductance of less than 100 $\mu$H, the second filter apparatus 8 may fail to remove noises as much as is desired. The coil $L_3$ can detecting the high-frequency leakage current $I_1$ without impairing the noise-removing function of the second filter apparatus 8 because it has an inductance of, for example, 100 $\mu$H or more, as indicated above.

The current-canceling circuit 30 outputs the canceling current $I_2$, through the capacitor 35 which has a capacitance equal to the electrostatic capacitance between the closed case 111 and the phase-windings 123$r$, 123$s$ and 123$t$, and which is provided for removing a DC component. Passed through the capacitor 35, the canceling current $I_2$ has a waveform very similar to the waveform of the high-frequency leakage current $I_1$. Hence, the current $I_2$ cancels out the high-frequency leakage current $I_1$ efficiently.

In the current-canceling circuit 30, the noise-removing resistor 36 is connected to the capacitor 35.

Therefore, the circuit 30 cooperates with the second filter apparatus 8, removing noises with high efficiency.

As indicated above, the capacitors 7*a* and 7*b* are connected in series between DC lines P and N connecting the rectifier circuit 6 and the switching circuit 13 and are located on the input side of the second filter apparatus 8. Further, as mentioned above, the capacitors 11*a* and 11*b* are connected in series between DC lines P and N and are located on the output side of the second filter apparatus 8. The capacitors 7*a*, 7*b*, 11*a* and 11*b* also help to increase the efficiency of removing noises.

Figure 7:
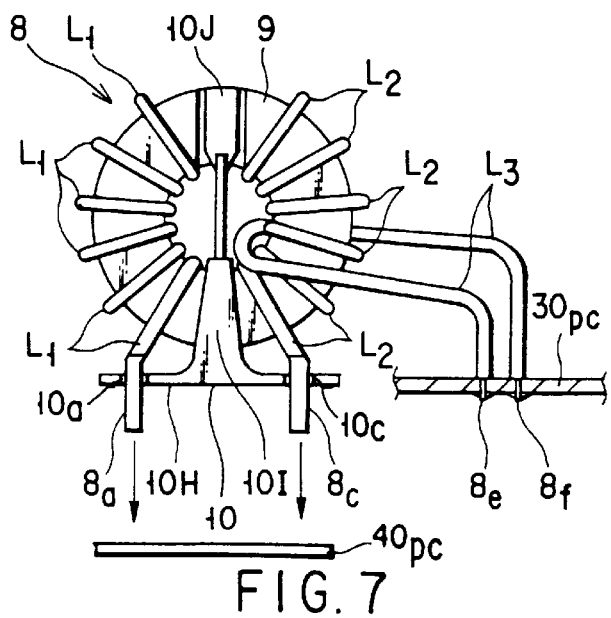
FIG. 7 is a front view of the filter apparatus incorporated in the first embodiment of the present invention.
Figure 8:
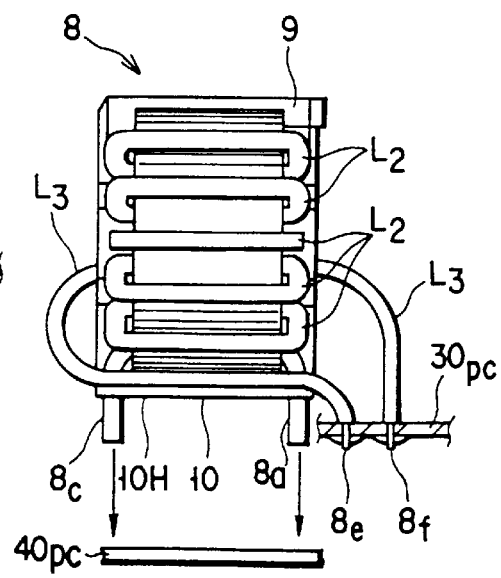
FIG. 8 is a side view of the second filter apparatus shown in FIG. 7.
Figure 9:
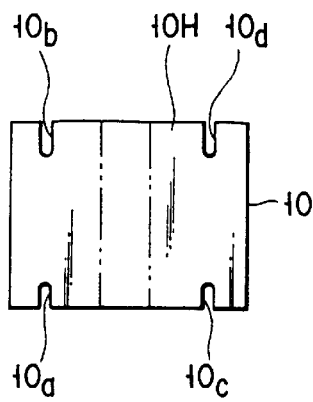
FIG. 9 is a plan view of the base of the core stand incorporated in the filter apparatus shown in FIG. 7.
Figure 10:
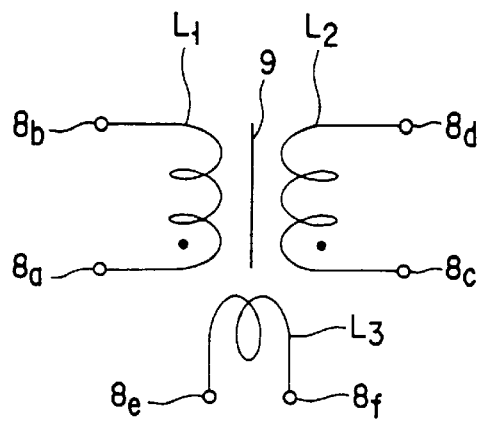
FIG. 10 is an equivalent circuit diagram of the filter apparatus incorporated in each embodiment of the invention.

The second filter apparatus 8 will be described in greater detail, with reference to FIGS. 7, 8, 9 and 10. FIGS. 7, 8 and 9 are a front view, a side view and a plan view of the apparatus 8, respectively. FIG. 10 is an equivalent circuit diagram of the apparatus 8.

As shown in 7, 8 and 10, connection terminals 8*a* and 8*b* are connected to the ends of the coil $L_1$, respectively, and are provided on the DC line P. Connection terminals 8*c* and 8*d* are connected to the ends of the coil $L_2$, respectively, and are provided on the DC line N.

The current-detecting coil $L_3$ for detecting the high-frequency leakage current (an unbalanced current) $I_1$ has one turn or more turns. Connection terminals 8*e* and 8*f* are connected to the ends of the current-detecting coil $L_3$, respectively. The connection terminals 8*e* and 8*f* are also connected to the current-canceling circuit 30.

The ferrite core 9 of the second filter apparatus 8 is ring-shaped. The core 9 stands upright on the circuit board (PC board) 40*pc* of the DC circuit 5*a*. More precisely, the core 9 is secured to the circuit board by means of a core stand 10. As shown in FIG. 7, the core stand 10 comprises a base 10H and two holding parts 10I and 10J. The lower holding part 10I extends vertically from the base 10H. The upper holding part 10J is connected to the top of the lower holding part 10I and extends upwards therefrom. The lower holding part 10I holds the lower part of the ferrite core 9, while the upper holding part 10J holds the upper part of the ferrite core 9. The base 10H of the core stand 10 is shaped like a plate. As FIG. 9 shows, the base 10H has four U-notches 10*a* to 10*d*, which allow passage of the rod-shaped connection terminals 8*a* to 8*d*, respectively.

The second embodiment of the present invention will be described, with reference to FIG. 11.

Figure 11:
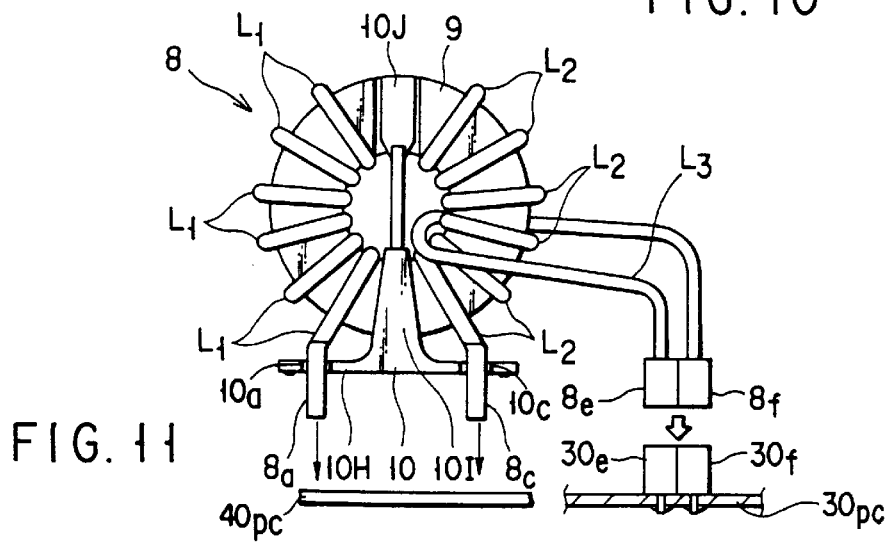
FIG. 11 is a front view of the filter apparatus incorporated in a second embodiment of the present invention.

FIG. 11 shows the inverter apparatus incorporated in an inverter apparatus 8 according to the second embodiment. This filter apparatus is characterized in three respects. First, connection terminals 8*e* and 8*f* are male-type. Second, the circuit board 30*pc* of a DC circuit has female-type connectors 30*e* and 30*f*.

Third, the connection terminals 8*e* and 8*f* are inserted in the connectors 30*e* and 30*f*, respectively. It is therefore easy to incorporate a current-detecting coil $L_3$ into the filter apparatus 8 and remove the coil $L_3$ therefrom.

Except for the features mentioned above, the second embodiment is identical to the first embodiment in structure.

The third embodiment of the invention will be described, with reference to FIG. 12.

Figure 12:
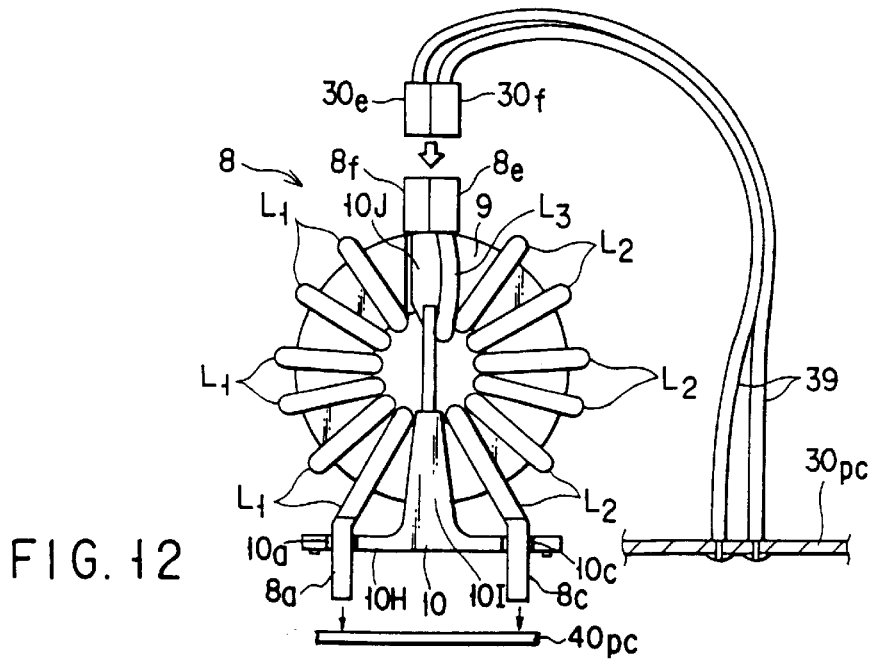
FIG. 12 is a front view of the filter apparatus incorporated in a third embodiment of this invention.

FIG. 12 shows the filter apparatus 8 provided in an inverter apparatus according to the third embodiment. As shown in FIG. 12, the apparatus 8 has connection terminals 8*e* and 8*f* of female-type. These connectors 8*e* and 8*f* are secured to the top of the holding part 10J of a core stand 10. Signal lines 39 are soldered at one end to the circuit board 30*pc* of a DC circuit, and at the other end to female-type connectors 30*e* and 30*f*. The connectors 30*e* and 30*f* are inserted in the connection terminals 8*e* and 8*f*.

Except for the features mentioned above, the third embodiment is identical to the first embodiment in structure.

The fourth embodiment of the invention will be described, with reference to FIGS. 13, 14 and 15. FIG. 13 is a front view of the filter apparatus 8 provided in an inverter apparatus according to the fourth embodiment. FIG. 14 is a side view of the filter apparatus 8, and FIG. 15 is a plan view of the base 10H of the core stand 10 provided in the filter apparatus 8.

As shown in FIGS. 13 and 14, the filter apparatus 8 has rod-shaped connection terminals 8*e* and 8*f*, which are connected to the ends of the current-detecting coil $L_3$, respectively. The base 10H of the core stand 10 has a part extending sideways and is therefore longer than its counterpart used in the second and third embodiments. The extending part of the base 10H has U-notches 10*e* and 10*f*, in which the rod-shaped connection terminals 8*e* and 8*f* are held. (The notches 10*e* and 10*f* may be replaced by through holes.) The filter apparatus 8 of the fourth embodiment has six connection terminals in all, i.e., the terminals 8*a* to 8*f*. Having six connection terminals, the filter apparatus 8 can be easily incorporated into the inverter apparatus.

Except for the features mentioned above, the fourth embodiment is identical to the first embodiment in structure.

The fifth embodiment of the invention will be described, with reference to FIG. 16.

FIG. 16 illustrates the filter apparatus 8 provided in an inverter apparatus according to the fifth embodiment. As shown in FIG. 16, an annular holding member 10x is set in the center space of an annular ferrite core 9. The holding member 10x holds a current-detecting coil $L_3$, spaced from coils $L_1$ and $L_2$. The member 10x is a part of a core stand 10.

Spaced from the coils $L_1$ and $L_2$ by the holding member 10x, the current-detecting coil $L_3$ is completely insulated from the coils $L_1$ and $L_2$. The coil $L_3$ can therefore detect noises and a high-frequency leakage current $I_1$, with high reliability.

Except for the features mentioned above, the fifth embodiment is identical to the first embodiment in structure.

The sixth embodiment of the invention will be described, with reference to FIG. 17.

FIG. 17 shows the filter apparatus 8 provided in an inverter apparatus according to the sixth embodiment. As shown in FIG. 17, a Y-shaped holding member 10y is set in the center space of an annular ferrite core 9. The holding member 10y holds a current-detecting coil $L_3$, spaced from coils $L_1$ and $L_2$. The member 10y is a part of a core stand 10.

Spaced from the coils $L_1$ and $L_2$ by the holding member 10y, the current-detecting coil $L_3$ is completely insulated from the coils $L_1$ and $L_2$. The coil $L_3$ can therefore detect noises and a high-frequency leakage current $I_1$, with high reliability.

Except for the features mentioned above, the sixth embodiment is identical to the first embodiment in structure.

The seventh embodiment of the invention will be described.

According to the present invention, the means for insulating the current-detecting coil $L_3$ from the coils $L_1$ and $L_2$ is not limited to the holding members 10x and 10y. In the inverter apparatus according to the seventh embodiment, the current-detecting coil $L_3$ may be made of a wire in an insulting sheath. Instead, partitions may be provided to insulate the coil $L_3$ from the coils $L_1$ and $L_2$. Alternatively, a plate having holes may be provided, guiding the current-detecting coil $L_3$ through the holes and spacing the same away from the coils $L_1$ and $L_2$.

The eighth embodiment of the invention will be described, with reference to FIG. 18.

Figure 18:
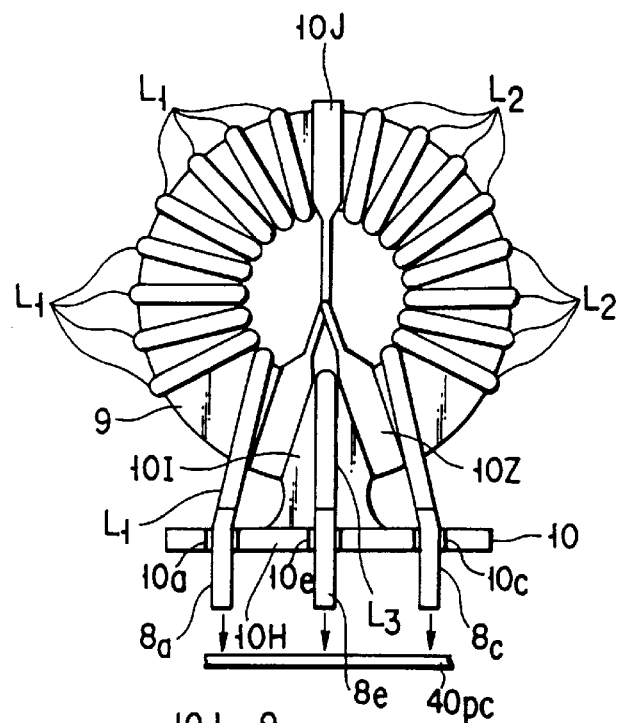
FIG. 18 is a front view of the filter apparatus incorporated in an eighth embodiment of this invention.

FIG. 18 shows the filter apparatus 8 provided in an inverter apparatus according to the eighth embodiment. As shown in FIG. 18, a current-detecting coil $L_3$ is provided, corresponding to the lower holding part 10I of a core stand 10. The lower holding part 10I connects the base 10H of the core stand 10 to a lower part of a ferrite core 9. The part 10I also holds the ferrite core 9 upright. The base 10H has U-notches 10e and 10f in the vicinity of the lower holding part 10I. Rod-shaped connection terminals 8e and 8f are held in the U-notches 10e and 10f, respectively. A holding member 10Z in the form of an inverted Y is provided, holding the current-detecting coil $L_3$ and spacing the same from the coils $L_1$ and $L_2$.

The current-detecting coil $L_3$ can be made shorter. Further, the base 10H of the core stand 10 can be made as small as is desired, though the current-detecting coil $L_3$ is secured to it.

Except for the features mentioned above, the eighth embodiment is identical to the first embodiment in structure.

The ninth embodiment of the invention will be described, with reference to FIG. 19.

Figure 19:
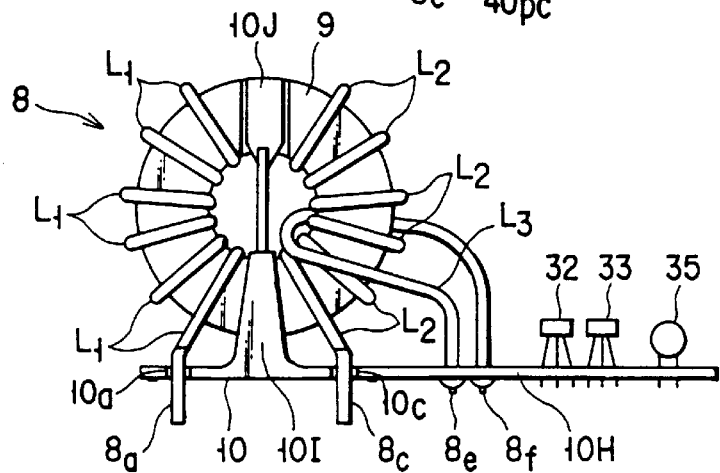
FIG. 19 is a front view of the filter apparatus incorporated in a ninth embodiment of the present invention.

FIG. 19 shows the filter apparatus 8 provided in an inverter apparatus according to the ninth embodiment. As shown in FIG. 19, the base 10H of a core stand 10 has a part extending sideways. Transistors 32 and 33 and capacitor 35, which constitute a current-canceling circuit 30, are attached to the extending part of the base 10H. Thus, the current-canceling circuit 30 is integral with the filter apparatus 8. In other words, the filter apparatus 8 has a current/noise-canceling section and can be handled as a single part.

Except for the features mentioned above, the ninth embodiment is identical to the first embodiment in structure.

The tenth embodiment of this invention will be described, with reference to FIGS. 20 and 21.

Figure 20:
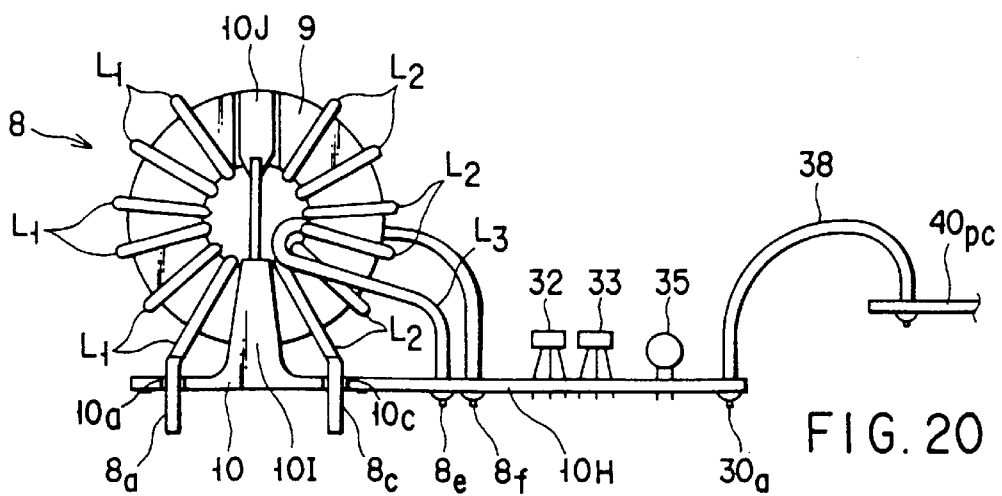
FIG. 20 is a front view of the filter apparatus incorporated in a tenth embodiment of the invention.
Figure 21:
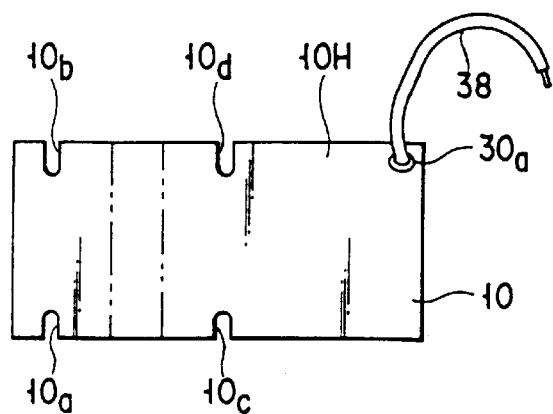
FIG. 21 is a plan view of the base of the core stand provided in the filter apparatus shown in FIG. 20.

FIG. 20 shows the filter apparatus 8 provided in an inverter apparatus according to the tenth embodiment. FIG. 21 is a plan view of the base 10H of the core stand 10 provided in the filter apparatus 8. As FIGS. 20 and 21 show, the base 10H of a core stand 10 has a part extending sideways. Transistors 32 and 33 and capacitor 35, which constitute a current-canceling circuit 30, are attached to the extending part of the base 10H. Thus, the current-canceling circuit 30 is integral with the filter apparatus 8. It is therefore possible to connect the output terminal 30a of a canceling circuit 30 to a circuit board 40pc, by soldering a signal line 38 to the circuit board 40pc.

Except for the features mentioned above, the tenth embodiment is identical to the first embodiment in structure.

The eleventh embodiment of the present invention will be described, with reference to FIG. 22.

Figure 22:
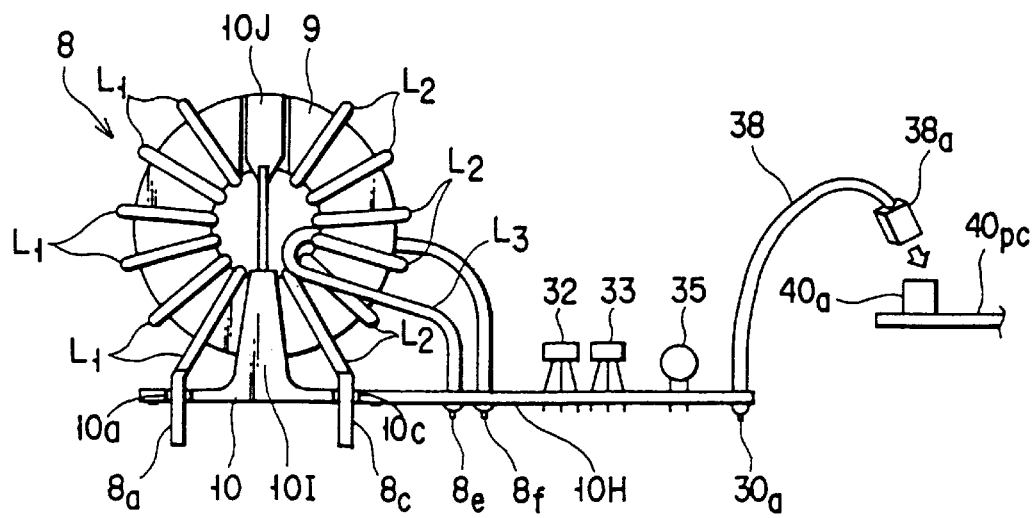
FIG. 22 is a front view of the filter apparatus incorporated in an eleventh embodiment of the invention.

FIG. 22 shows the filter apparatus 8 provided in an inverter apparatus according to the eleventh embodiment. As shown in FIG. 22, the output terminal 30a of a canceling circuit 30 to one end of the signal line 38. The signal line 38 has a connector 38a at the other end. The connector 38a is connected to a circuit board 40pc. Hence, the output terminal 30a is electrically connected to the circuit board 40pc.

The twelfth embodiment of this invention will be described, with reference to FIG. 23.

Figure 23:
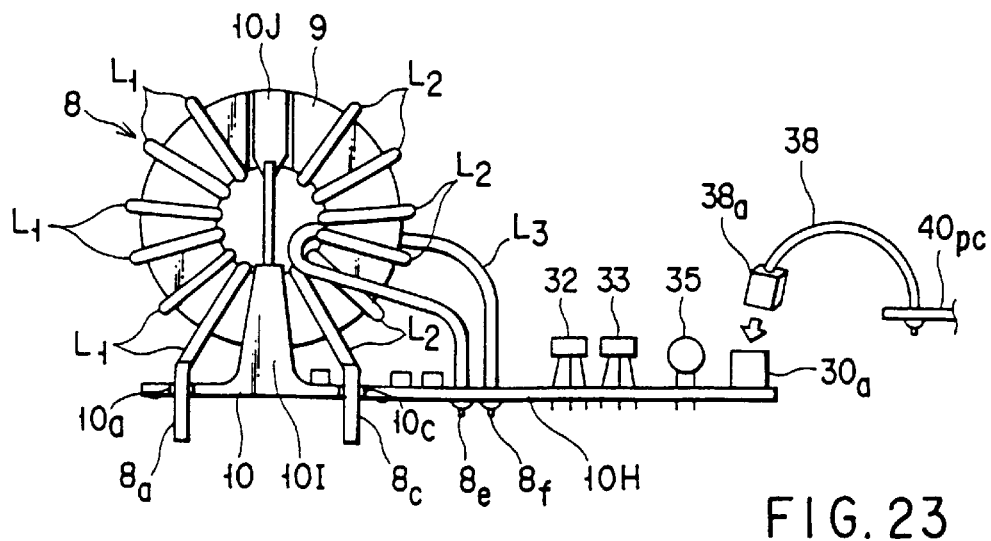
FIG. 23 is a front view of the filter apparatus incorporated in a twelfth embodiment of the invention.

FIG. 23 illustrates the filter apparatus 8 provided in an inverter apparatus according to the twelfth embodiment. As shown in FIG. 23, a signal line 38 is connected at one end to a circuit board 40pc. The signal line 38 has a connector 38a at the other end. The connector 38a is connected to the output terminal 30a of a canceling circuit 30. Hence, the output terminal 30a is electrically connected to the circuit board 40pc.

Figure 25:
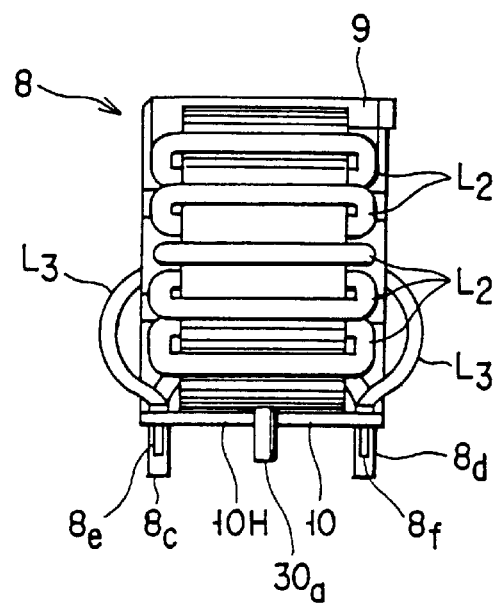
FIG. 25 is a side view of the filter apparatus shown in FIG. 24.
Figure 26:
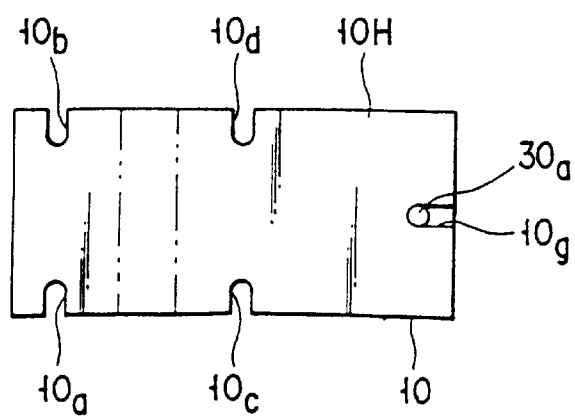
FIG. 26 is a plan view of the base of the core stand provided in the filter apparatus shown in FIG. 24.

The thirteenth embodiment of the present invention will be described, with reference to FIGS. 24, 25 and 26.

Figure 24:
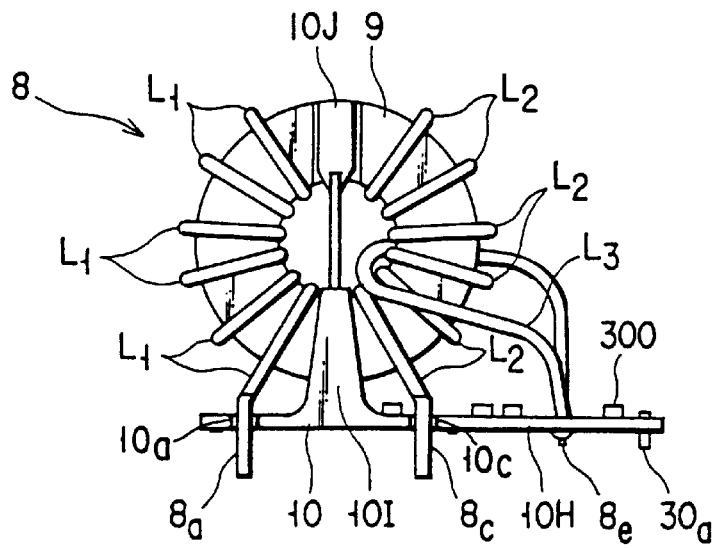
FIG. 24 is a front view of the filter apparatus incorporated in a thirteenth embodiment of the invention.

FIG. 24 shows the filter apparatus 8 incorporated in an inverter apparatus according to a thirteenth embodiment of the invention. FIG. 25 is a side view of the filter apparatus, and FIG. 26 is a plan view of the base of the core stand provided in the filter apparatus. As shown in FIGS. 24, 25 and 26, the base 10H of a core stand 10 has a part extending sideways. A chip 300 is mounted on the extending part of the base 10H. The extending part has a U-notch 10g, in which a rod-shaped output terminal 30a is inserted and held. As a result, the filter apparatus has five terminals, i.e., one output terminal 30a and four connection terminals 8a, 8b, 8c and 8d.

Except for the features mentioned above, the thirteenth embodiment is identical to the first embodiment in structure.

In the first to thirteenth embodiments described above, the filter apparatus 8 is provided on a single-phase line.

Nonetheless, the filter apparatus 8 can operate in the same way if it is provided on a line of three or more phases.

The fourteenth embodiment of the invention will be described, with reference to FIG. 27.

Figure 27:
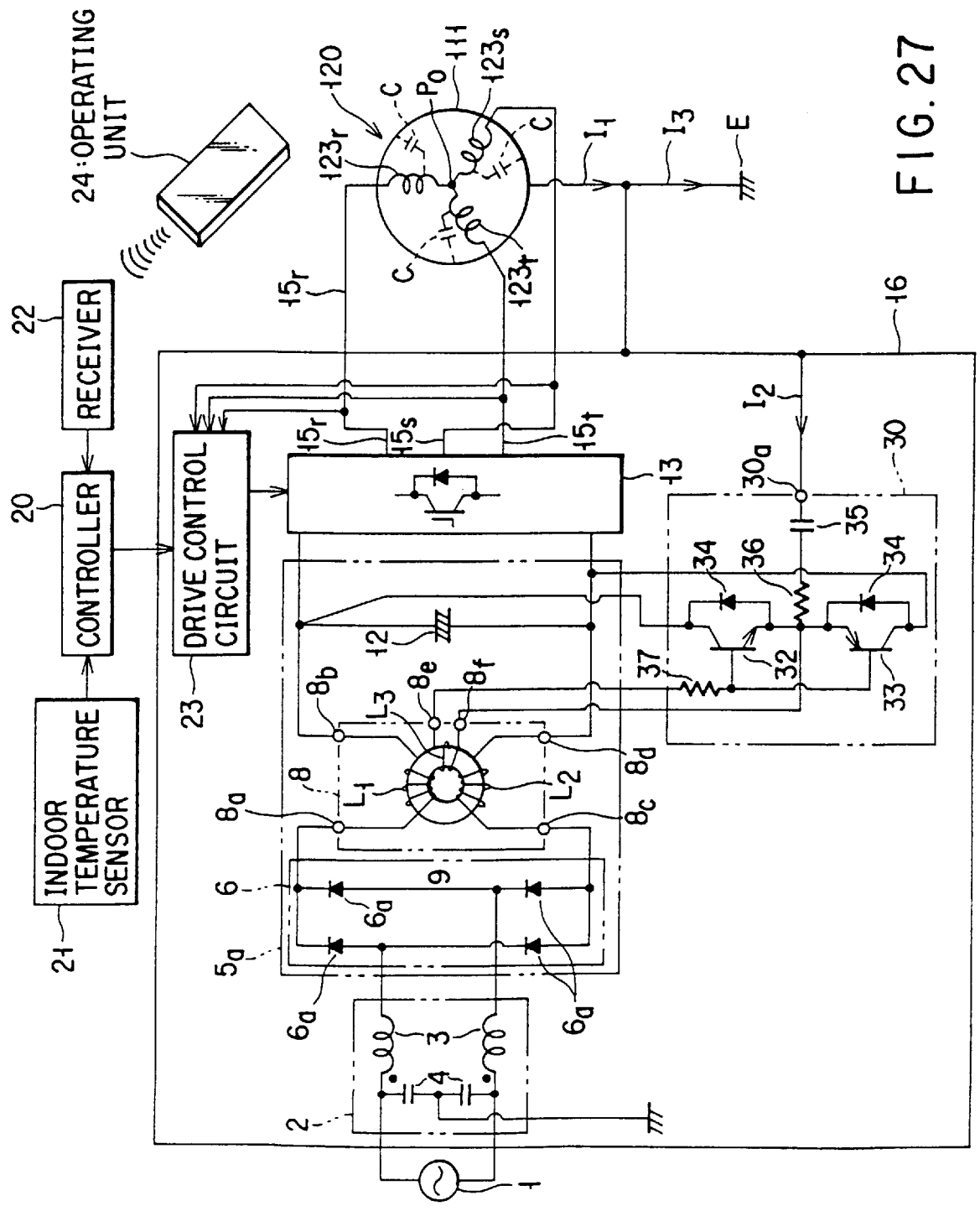
FIG. 27 is a block diagram showing the control circuit incorporating an inverter apparatus according to a fourteenth embodiment of the invention.

FIG. 27 shows the control circuit incorporating an inverter apparatus according to the fourteenth embodiment. As shown in FIG. 27, the inverter apparatus and a drive control circuit 23 are contained in a metal housing 16. The output terminal 30a of the current-canceling circuit 30 is connected to the metal housing 16. The housing 16 is mounted on the outdoor unit of an air conditioner.

Except for the features mentioned above, the fourteenth embodiment is identical to the first embodiment in structure.

When the metal housing 16 is mounted on the outdoor unit, it is automatically connected to the ground by the components of the outdoor unit. In other words, once the housing 16 is placed on the outdoor unit, the output terminal 30a of the current-canceling circuit 30 is automatically connected to the ground by the metal housing. Hence, the fourteen embodiment serves to facilitate the assembling of the air conditioner. Furthermore, the fourteenth embodiment achieves the same advantages as the first embodiment.

The fifteenth embodiment of the present invention will be described, with reference to FIG. 28.

Figure 28:
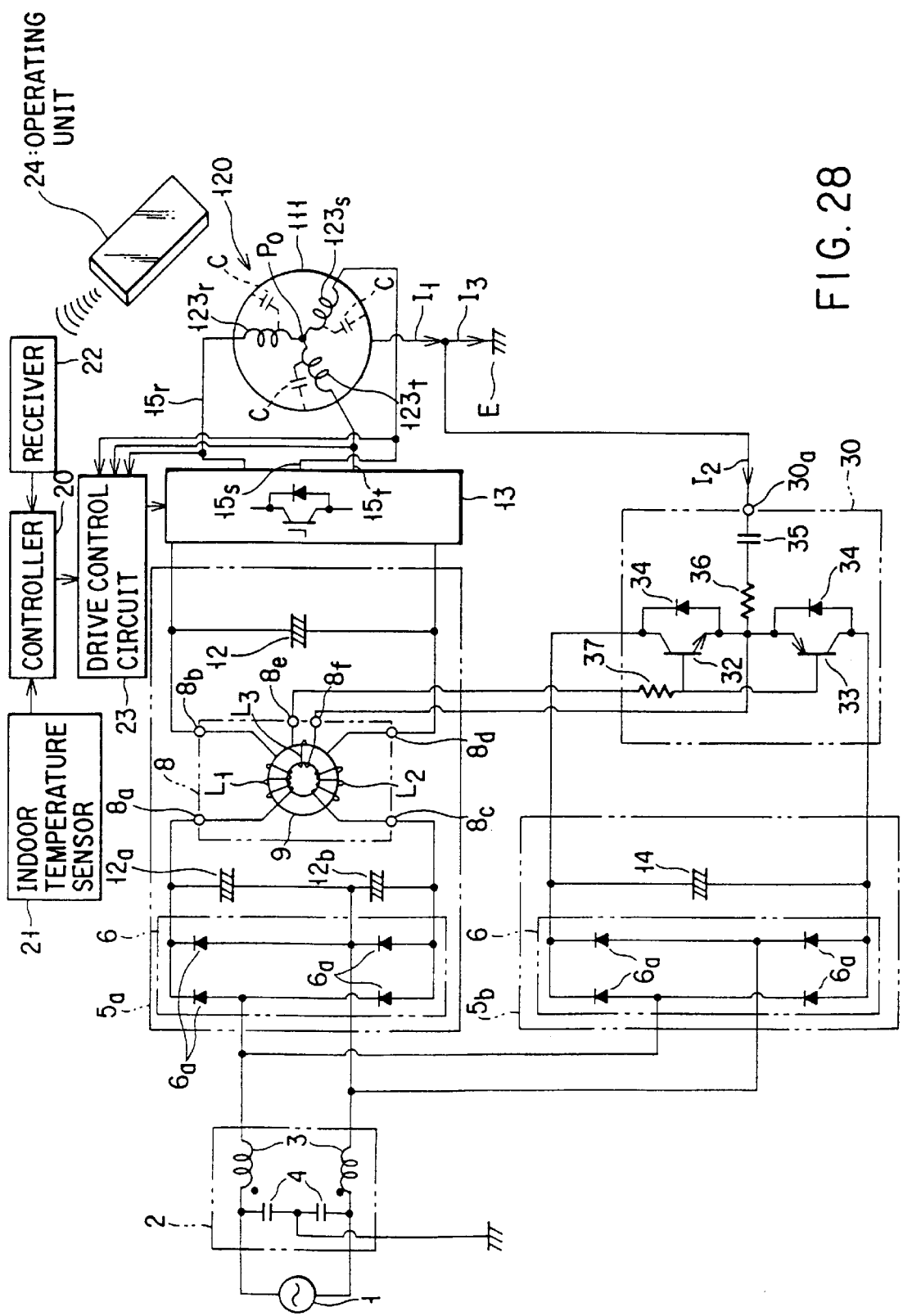
FIG. 28 is a block diagram showing the control circuit incorporating an inverter apparatus according to a fifteenth embodiment of the present invention.

FIG. 28 shows the control circuit incorporating an inverter apparatus according to the fifteenth embodiment. As shown in FIG. 28, a DC circuit 5b is connected by the filter apparatus 2 to a commercially available power supply 1. The DC circuit 5b comprises a rectifier circuit 6 and a smoothing capacitor 14. The rectifier circuit 6 (second rectifier circuit) has four diodes 6a connected, forming a bridge. The smoothing capacitor 14 is connected to the output of the rectifier circuit 6. The DC circuit 5b converts the AC voltage applied from the power supply 1 to a DC voltage that is lower than the output voltage of a DC circuit 5a. The output voltage of the DC circuit 5b is applied, as an operation voltage, to a current-canceling circuit 30.

The DC circuit 5a comprises a pair of smoothing capacitors 12a and 12b. The smoothing capacitors 12a and 12b are connected to the output of the rectifier circuit 6.

Except for the features mentioned above, the fifteenth embodiment is identical to the first embodiment in structure.

Having the structural features described above, the fifteenth embodiment can operate correctly, without breaking down the transistors 32 and 33 incorporated in the current-canceling circuit 30, even if the transistors 32 and 33 have relatively low withstand voltage. In addition, the fifteenth embodiment achieves the same advantages as the first embodiment.

All embodiments described above are inverter apparatuses for use in air conditioners. Nonetheless, they can be used in any refrigeration cycle other than an air conditioner in the same way as in an air conditioner.

Moreover, the present invention is not limited to the embodiments described above. Rather, various changes and modifications can be made within the scope and spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A filter apparatus for use in an inverter apparatus for supplying drive power to a motor, said filter apparatus comprising:

a core;

coils mounted on said core, said coils being adapted to be provided on lines incorporated in the inverter apparatus; and a current-detecting coil for detecting a leakage current, said current-detecting coil being mounted on said core and having ends adapted to be connected to a circuit board of the inverter apparatus.

2. The filter apparatus according to claim 1, further comprising a connector for connecting ends of the current-detecting coil to said circuit board.

3. The filter apparatus according to 2, further comprising:

an annular holding member for spacing said current-detecting coil from said coils.

4. The filter apparatus according to claim 3, wherein the current-detecting coil is mounted on a part of said core corresponding to said core-holding stand.

5. The filter apparatus according to claim 1, further comprising:

connection terminals being provided at the ends of said coils and said current-detecting coil; and a holding member for holding said connection terminals and securing said core to said circuit board of the inverter apparatus.

6. The filter apparatus according to claim 5, further comprising:

an annular holding member for spacing said current-detecting coil from said coils.

7. The filter apparatus according to claim 1, further comprising an annular holding member for spacing said current-detecting coil from said coils.

8. The filter apparatus according to claim 1, further comprising:

connection terminals being provided at the ends of said coils and said current-detecting coil; and a core-holding stand being adapted to be provided on a circuit board of said inverter apparatus comprising:

a base having notches for receiving and holding said connection terminals located near said core holding stand; and a lower and an upper part for holding said core.

9. The filter apparatus according to claim 1, further comprising:

a detection means for detecting through a current-detecting coil a leakage current and a noise generated in the inverter apparatus; and a canceling means for canceling the leakage current and noise detected by the detection means.

10. The filter apparatus according to claim 1, further comprising:

a holding member for securing said core to said circuit board of the inverter apparatus;

a detection means for detecting through said current-detecting coil a leakage current and a noise generated in the inverter apparatus, said detection means being provided on said holding member; and a canceling means for canceling said leakage current and said noise detected by said detection means, said canceling means being provided on said holding member.

* * * * *